(12) United States Patent
Liu

(10) Patent No.: US 11,361,005 B2
(45) Date of Patent: Jun. 14, 2022

(54) METHOD FOR PROCESSING MAP DATA, DEVICE, AND STORAGE MEDIUM

(71) Applicant: BEIJING BAIDU NETCOM SCIENCE AND TECHNOLOGY CO., LTD., Beijing (CN)

(72) Inventor: Wei Liu, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 17/133,886

(22) Filed: Dec. 24, 2020

(65) Prior Publication Data
US 2021/0390124 A1 Dec. 16, 2021

(30) Foreign Application Priority Data
Jun. 10, 2020 (CN) .......................... 202010522396.1

(51) Int. Cl.
G06F 16/29 (2019.01)
G06F 16/9537 (2019.01)
G01C 21/00 (2006.01)
G01C 21/36 (2006.01)
G06T 11/60 (2006.01)

(52) U.S. Cl.
CPC ......... *G06F 16/29* (2019.01); *G01C 21/3673* (2013.01); *G01C 21/3811* (2020.08); *G06F 16/9537* (2019.01); *G06T 11/60* (2013.01); *G06T 2200/24* (2013.01)

(58) Field of Classification Search
CPC . G06F 16/29; G06F 16/9537; G01C 21/3811; G01C 21/3673; G06T 11/60; G06T 2200/24
See application file for complete search history.

(56) References Cited

U.S. PATENT DOCUMENTS

2011/0065376 A1 3/2011 Forutanpour et al.
2019/0323854 A1* 10/2019 Tamai ....................... G06F 3/16
(Continued)

FOREIGN PATENT DOCUMENTS

JP 2011058843 A 3/2011
JP 2012145432 A 8/2012
JP 2017166980 A 9/2017
(Continued)

OTHER PUBLICATIONS

European Patent Application No. 21153920.0 Search and Opinion dated Jul. 21, 2021, 12 pages.
(Continued)

*Primary Examiner* — Jennifer Mehmood
*Assistant Examiner* — Andrew Shin
(74) *Attorney, Agent, or Firm* — Lathrop GPM LLP

(57) ABSTRACT

The disclosure discloses a method for processing map data, a device, and a storage medium. The detailed implementing solution includes: determining POI data of bound points of interest (POI) of a road to be marked in response to obtaining a road marking instruction; selecting target POI data from the POI data of the bound POIs based on a scene where a user is located; and rendering a map interface based on road information of the road to be marked and the target POI data, and displaying the map interface rendered.

15 Claims, 6 Drawing Sheets

(56) References Cited

U.S. PATENT DOCUMENTS

2020/0012389 A1    1/2020   Mikhaylov et al.
2020/0363231 A1*  11/2020   Pandey ............... G06F 16/2477

FOREIGN PATENT DOCUMENTS

JP           2018072894 A    5/2018
WO       WO 2009151928 A2   12/2009

OTHER PUBLICATIONS

Japanese Patent Application No. 2021-086117 Office Action dated Mar. 22, 2022, 4 pages.
Japanese Patent Application No. 2021-086117 English translation of Office Action dated Mar. 22, 2022, 4 pages.

* cited by examiner

METHOD FOR PROCESSING MAP DATA, DEVICE, AND STORAGE MEDIUM

CROSS REFERENCE TO RELATED APPLICATION

This application is based on and claims priority to Chinese patent application No. 202010522396.1, filed on Jun. 10, 2020, the entire content of which is hereby incorporated into this application by reference.

FIELD

Embodiments of the disclosure relate to a field of data processing, and more particularly, to a field of intelligent search technologies.

BACKGROUND

With the development of information technologies, users increasingly rely on electronic maps when travelling. For example, a current position, a navigation route, and POIs (points of interest) along a road may be viewed on the electronic map.

SUMMARY

According to a first aspect of the disclosure, a method for processing map data is provided. The method includes: determining POI data of bound points of interest (POI) of a road to be marked in response to obtaining a road marking instruction; selecting target POI data from the POI data of the bound POIs based on a scene where a user is located; and rendering a map interface based on road information of the road to be marked and the target POI data, and displaying the map interface rendered.

According to a second aspect of the disclosure, an electronic device is provided. The electronic device includes: at least one processor and a memory. The memory is communicatively coupled to the at least one processor. The memory is configured to store instructions executed by the at least one processor. When the instructions are executed by the at least one processor, the at least one processor is configured to: determine POI data of bound POIs of a road to be marked in response to obtaining a road marking instruction; select target POI data from the POI data of the bound POIs based on a scene where a user is located; and render a map interface based on road information of the road to be marked and the target POI data, and to display the map interface rendered.

According to a third aspect of the disclosure, a non-transitory computer readable storage medium is provided. The non-transitory computer readable storage medium has computer instructions stored thereon. The computer instructions are configured to enable a computer to execute a method for processing the map data, and the method includes: determining POI data of bound POIs of a road to be marked in response to obtaining a road marking instruction; selecting target POI data from the POI data of the bound POIs based on a scene where a user is located; and rendering a map interface based on road information of the road to be marked and the target POI data, and displaying the map interface rendered.

It should be understood that, description in Summary of the disclosure does not aim to limit a key or important feature in embodiments of the disclosure, and does not used to limit the scope of the disclosure. Other features of the disclosure will be easily understood by following descriptions.

BRIEF DESCRIPTION OF THE DRAWINGS

The accompanying drawings are used for better understanding the solution and do not constitute a limitation of the disclosure.

DETAILED DESCRIPTION

Description will be made below to exemplary embodiments of the disclosure with reference to accompanying drawings, which includes various details of embodiments of the disclosure to facilitate understanding and should be regarded as merely examples. Therefore, it should be recognized by the skilled in the art that various changes and modifications may be made to the embodiments described herein without departing from the scope and spirit of the disclosure. Meanwhile, for clarity and conciseness, descriptions for well-known functions and structures are omitted in the following description.

Figure 1:
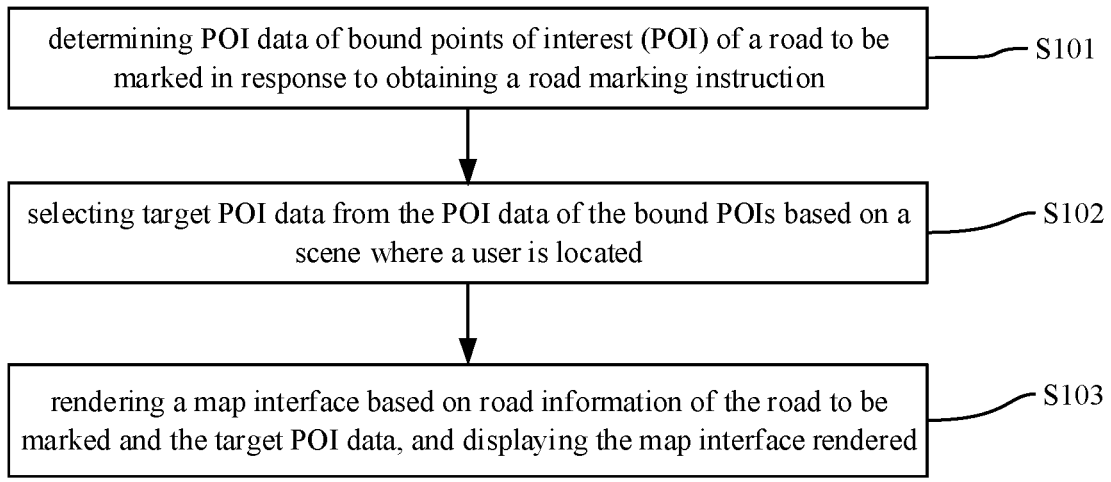
FIG. 1 is a flow chart illustrating a method for processing map data according to an embodiment of the disclosure.

FIG. 1 is a flow chart illustrating a method for processing map data according to an embodiment of the disclosure. Embodiments of the disclosure are applicable to a condition for processing map data based on a road marking instruction triggered by a user. Embodiments may be executed by an apparatus for processing map data configured in an electronic device. The apparatus may be implemented by software and/or hardware. Alternatively, the electronic device may be a client device of a map application, or a server of the map application. As illustrated in FIG. 1, the method includes the following.

At block S101, POI data of bound points of interest (POI) of a road to be marked is determined in response to obtaining a road marking instruction.

In embodiments of the disclosure, the road marking instruction may be an instruction for indicating the electronic device to mark POIs around the road in a map. In some embodiments, the road marking instruction may be triggered by clicking a route or a road name of a certain road when a user views the POIs around the road in the map, or triggered by the user clicking a POI marking button on an interface of the map application, or also triggered automatically by a system after detecting that the map application is started, which is not limited by embodiments of the disclosure. The road marking instruction may be triggered and generated at the client device of the map application. The client device may directly respond to the road marking instruction generated in local when the execution subject in embodiments of the disclosure is the client device of the map application. The client device may send the road marking instruction to the server after the road marking instruction is generated, and the server may respond to the road marking instruction, when the execution subject in embodiments of the disclosure is the server of the map application.

The road to be marked in embodiments of the disclosure may refer to a road indicated to mark the POIs around the road currently in the road marking instruction. In some embodiments, a road selected by the user may be taken as the road to be marked, in response to determining that a road is selected by the user to be marked when the road marking instruction is generated. For example, a road A selected by the user may be taken as the road to be marked, when the user clicks on a road name of the road A to generate the road marking instruction. A road closest to a current position of the user may be taken as the road to be marked, in response to determining that a road is not selected by the user to be marked when the road marking instruction is generated. For example, the road closest to the current position of the user may be taken as the road to be marked, when the road marking instruction is triggered automatically after the application is started, or triggered by directly clicking the POI marking button rather than a road being selected by the user. The POI data of the bound POIs of the road to be marked may be POI data bound to the road to be marked and marked around the road to be marked. In some embodiments, the POI data of the bound POI may include a name, an icon, an address, a brief introduction of the POI, and an orientation of the bound POI from the road to be marked.

In some embodiments, the client device or server of the map application determines the road to be marked currently based on the road marking instruction in response to obtaining the road marking instruction. In detail, the road selected by the user may be taken as the road to be marked, or the road closest to the current position of the user may be taken as the road to be marked. The POI data of the bound POIs corresponding to the road to be marked may be further determined after the road to be marked is determined. In detail, an association relationship between each road and a POI bound to the road may be set in advance. The road to be marked may be searched based on the association relationship, and the POI data of the bound POIs may be obtained. POI data of bound POIs located within a certain range near the road to be marked in a POI database may also be searched as the POI data corresponding to the road to be marked. The POI data of the bound POIs of the road to be marked may also be obtained in other way, which is not limited in embodiments of the disclosure.

At block S102, target POI data is selected from the POI data of the bound POIs based on a scene where a user is located.

In some embodiments of the disclosure, the scene where the user is located may include a travel scene and a region scene. The travel scene may include, but be not limited to, a commuting scene and a driving travel scene. The region scene may include, but be not limited to, a scenic spot scene (such as a park, a tourist attraction, a pedestrian street and an amusement park), a business region scene (such as a shopping mall, and a financial and commercial center), and a traffic region scene (such as a subway station, a motor passenger station, a bus station, and an airport). The target POI data may be the POI data screened from the POI data of the bound POIs to be marked currently around the road to be marked.

In some embodiments, there are multiple ways for determining the scene where the user is located, which are not limited. For example, determination conditions of multiple candidate scenes may be preset, and a current scene where the user is located may be determined by determining whether the current scene meets the determination condition of the candidate scene. For example, for a candidate region scene, the determination condition may be determining whether the current position of the user is located in a region corresponding to the candidate region scene. the current scene where the user is located is the candidate region scene in response to determining that the current position of the user is located in the region corresponding to the candidate region scene. For the commuting scene in candidate travel scenes, the determination condition may be determining whether a current time point is in a peak period of commuting. The current scene where the user is located is the commuting scene in response to determining that the current time point is in the peak period of commuting. For the driving travel scene in the candidate travel scenes, the determination condition may be determining whether a driving navigation function is started at present. The current scene where the user is located is the driving travel scene in response to determining that the driving navigation function is started at present. In some embodiments, in order to improve the accuracy of determining the scene where the user is located, a user profile may also be built for each user in advance based on operation data generated by the user using the map application. The current scene where the user is located is accurately predicted based on the user profile, the current position of the user, the current time point, and a current use state of the map application. For example, assuming that the user usually gets off work at 8:00 pm described in the user profile, the scene where the user is currently located is the commuting scene in response to determining that the current time point is around 8:00 pm.

In some embodiments, a target POI that the user pays the most attention to is selected for marking based on the scene the user is located, rather than all the bound POIs are statically marked around the road to be marked. In detail, in embodiments of the disclosure, there are multiple ways for selecting the target POI data from the POI data of the bound POIs based on scene where the user is located, which are not limited.

In a first implementation, the POI data of the bound POIs is screened to determine the target POI data based on the scene where the user is located and a scene tag corresponding to POI data of each bound POI. In detail, a corresponding scene tag may be set in advance for POI data of each bound POI. The scene tag bound to POI data of each bound POI is viewed, and the POI data of each bound POI of which the scene tag conforms to the scene where the user is located is taken as the target POI data. For example, assuming that POI data of the bound POIs of a certain road includes POI1-POI5, when scene tags of POI1 and POI3 are the business region scene, and the current scene where the user is located is also the business region scene, the selected target POI data is the POI1 data and POI3 data.

In a second implementation, a data type to be displayed in the scene is determined based on the scene where the user is located, and the POI data of the bound POIs is screened to determine the target POI data based on the data type. In detail, multiple candidate scenes may be preset, and a corresponding data type to be displayed (i.e., a data type to be displayed of the target POI data) is set for each candidate scene. The data type to be displayed corresponding to the scene where the user is located may be queried, and then POI data of the bound POIs belonging to the data type is taken as the target POI data. In this embodiment, the preset multiple candidate scenes may include, but be not limited to, the scenic spot scene, the business region scene, the traffic region scene, the commuting scene and the driving travel scene. A data type to be displayed corresponding to the scenic spot scene is a rich content data type. Accordingly, when the scene where the user is located is the scenic spot scene, the target POI data with the rich content data type is screened from the POI data of the bound POIs, for example, a brief text, a picture and a video of a symbolic POI in the scenic spot are screened from the POI data of the bound POIs as the target POI data. A data type to be displayed corresponding to the business region scene is a landmark element type. Accordingly, when the scene where the user is located is the business region scene, target POI data with the landmark element type is screened from the POI data of the bound POIs, for example, easy-to-find signs such as a shopping mall, a building and a landmark building in the business region are screened from the POI data of the bound POIs as the target POI data. A data type to be displayed corresponding to the traffic region scene is a geographical element type. Accordingly, when the user is located in the traffic region scene, target POI data with the geographical element type is screened from the POI data of the bound POIs, for example, geographical signs such as a traffic light, a road sign, a subway gate, a bus stop are selected as the target POI data from the POI data of the bound POIs. A data type to be displayed corresponding to the commuting scene and the driving travel scene is a traffic sign type. Accordingly, when the user is in the commuting scene or the driving travel scene, target POI data with the traffic sign type is screened from the POI data of the bound POIs, for example, traffic signs such as a traffic light, a camera and a speed limit sign are screened from the POI data of the bound POIs as target POI data. In embodiments of the disclosure, the target POI data is screened based on the data type to be displayed in the scene where the user is located, and the screened target POI data may better meet a personalized requirement of the user for viewing the POIs in the current scene, such that a POI marking function of the map application is more intelligent.

At block S103, a map interface is rendered based on road information of the road to be marked and the target POI data, and the rendered map interface is displayed.

The road information of the road to be marked may include, but be not limited to, a road name, a road route, a lane line, and road condition information.

In some embodiments, when the target POI data is marked for the road to be marked, a map interface rendering template may be called to render the map interface, and the map interface is rendered based on the road information of the road to be marked and the target POI data. In other words, the rendering process is the process of marking the target POI data. After the rendering process is completed, the rendered map interface may be displayed to the user. The target POI data has been marked around the road to be marked in the map interface when the user views the map interface. In detail, when the execution subject in embodiments of the disclosure is the client device of the map application, the client device may render the map interface based on the road information of the road to be marked and the target POI data, and then display the rendered map interface to the user via a display screen of the client device. When the execution subject in embodiments of the disclosure is the server of the map application, the server may feed the rendered map interface back to the client device after obtaining the rendered map interface, such that the client device may display the rendered map interface to the user. In some embodiments, the server may also encapsulate the road information of the road to be marked and the target POI data, and feed encapsulated data back to the client device, such that the client device may render the map interface based on the road information and the target POI data in the encapsulated data, and display the rendered map interface to the user. The method for rendering the map interface is not limited in embodiments of the disclosure.

With the technical solution of embodiments of the disclosure, the POI data of the bound POIs of the road to be marked is determined in response to obtaining the road marking instruction. The target POI data to be marked currently is further selected from the POI data of the bound POIs based on the current scene where the user is located. Then the rendered map interface is displayed to the user after the map interface is rendered based on the road information of the road to be marked and the target POI data. With the technical solution according to embodiments of the disclosure, the road is marked with the POI data corresponding to the scene based on the scene where the user is located, rather than the road is statically marked with fixed POI data, which may mark the POI data that meets the requirement of the user in combination with the requirements of the user in different scenes. A problem that an intelligent search service of an existing electronic map may not meet the personalized requirement of the user for viewing map data in different scenes is solved. The flexibility and intelligence of marking the POI data for the road in the map are improved. A data display scheme of the electronic map is improved.

Figure 2A:
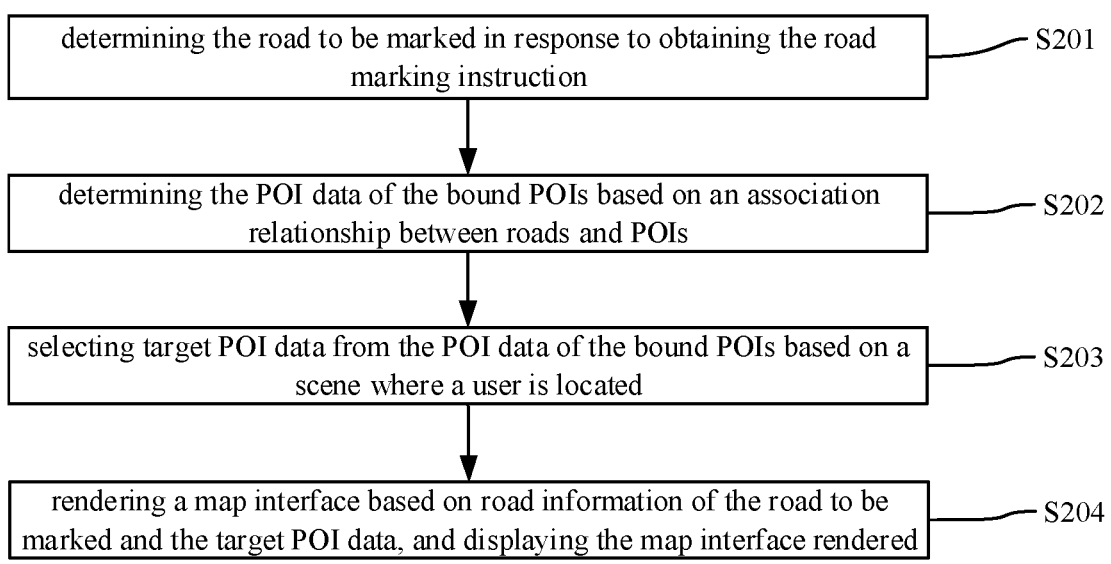
FIG. 2A is a flow chart illustrating a method for processing map data according to another embodiment of the disclosure.
Figure 2B:
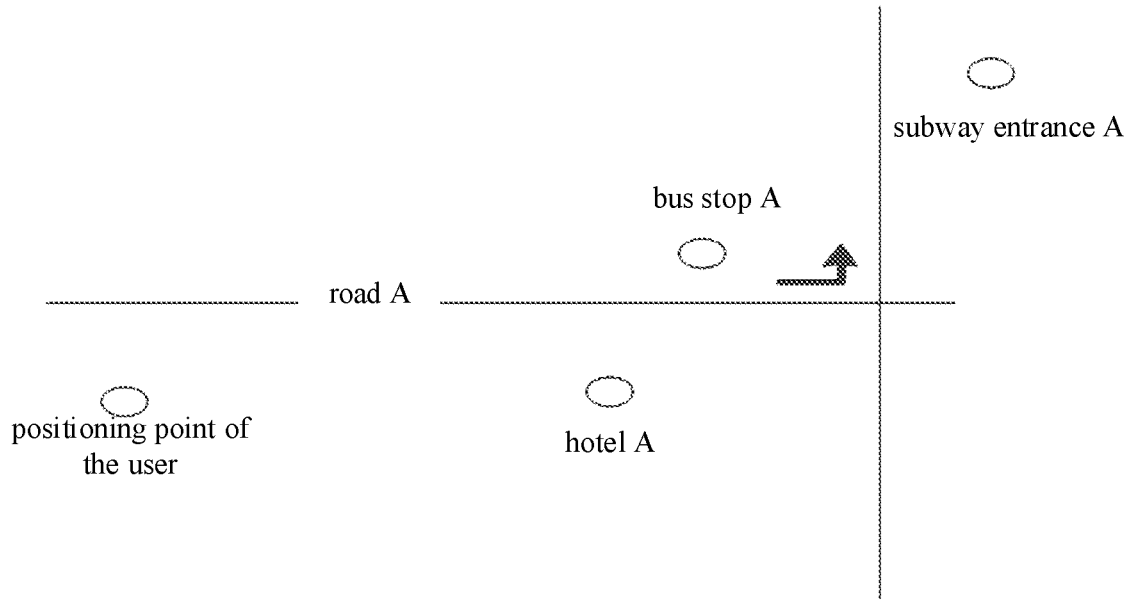
FIG. 2B is a schematic diagram illustrating POI data of bound POIs around a road A according to an embodiment of the disclosure.

FIG. 2A is a flow chart illustrating a method for processing map data according to another embodiment of the disclosure. FIG. 2B is a schematic diagram illustrating POI data around a road A according to an embodiment of the disclosure. This embodiment is further improved on the basis of the above embodiment. Description is made in detail to determining the POI data of the road to be marked in response to obtaining the road marking instruction. As illustrated in FIGS. 2A-2B, the method includes the following.

At block S201, the road to be marked is determined in response to obtaining the road marking instruction.

In some embodiments, different ways for triggering the road marking instruction correspond to different ways for determining the road to be marked in response to obtaining the road marking instruction.

In detail, in embodiments of the disclosure, the road selected by the user may be directly taken as the road to be marked in response to determining that a road is selected by the user to be marked when the road marking instruction is triggered to generate. Exemplarily, as illustrated in FIG. 2B, when the user views the POIs around the road A, the user clicks the road route or the road name of the road A to generate the road marking instruction, then the road A clicked by the user may be taken as the road to be marked.

In some embodiments of the disclosure, the road closest to the current position of the user may be taken as the road to be marked in response to determining that the road is not selected by the user to be marked when the road marking instruction is triggered to generate. For example, when the road marking instruction is triggered by the user clicking the POI marking button on the interface of the map application, or automatically triggered by the electronic device after detecting that the map application is started, the road A in FIG. 2B closest to a current positioning point of the user may be taken as the road to be marked in response to determining that the road is not selected by the user to be marked.

At block S202, the POI data of the bound POIs is determined based on an association relationship between roads and POIs.

The association relationship between the roads and the POIs may be a corresponding relationship constructed for each road in the map and POI data of the bound POIs corresponding to each road based on a preset rule. Description will be made in detail to constructing the association relationship in following embodiments. In some embodiments, the association relationship between the roads and the POIs may include a binding relationship and/or a topological relationship. The binding relationship may be an association relationship between each road and content information of the bound POIs of the road. The content information of the bound POI may include, but be not limited to, the name, icon and introduction information of the bound POI. Exemplarily, as illustrated in FIG. 2B, the binding relationship between the road A and bound POIs of the road A may be: the road A→(a bus stop A: content information; a hotel A: content information; and a subway entrance A: content information). The topological relationship may be an association relationship between a road and orientation information of the bound POIs of the road. The orientation information of the bound POI may include, but be not limited to, an orientation, a distance and the like of the bound POI relative to the road. Exemplarily, as illustrated in FIG. 2B, the topological relationship between the road A and the bound POIs of the road A may be: road A→(a bus station A: north, less than 500 m; a hotel A: south, less than 500 m; and a subway entrance A: northeast, 1.2 km).

In some embodiments, the road to be marked may be queried based on the association relationship between the roads and the POIs after the road to be marked is determined, and then the POI data of the bound POIs corresponding to the road to be marked in the association relationship is taken as the POI data of the bound POIs of the road to be marked. In detail, when the association relationship between the roads and the POIs includes the binding relationship, the content information of the bound POIs of the road to be marked may be determined as the POI data of the bound POIs of the road to be marked based on the binding relationship between the roads and the POIs. Exemplarily, as illustrated in FIG. 2B, when the road to be marked is the road A, the content information of the bus station A, the hotel A and the subway entrance A may be taken as the content information of the bound POIs of the road A, that is, the POI data of the bound POIs of the road A, based on the binding relationship between the road A and the bound POIs of the road A. When the association relationship between the roads and the POIs includes the topological relationship, the orientation information of the bound POIs of the road to be marked may be determined as the POI data of the road to be marked based on the topological relationship between the roads and the POIs. Exemplarily, as illustrated in FIG. 2B, when the road to be marked is the road A, the bus station A—north-less than 500 m, the hotel A—south-less than 500 m, and the subway entrance A—northeast-1.2 km may be taken as the orientation information of the bound POIs of the bus station A, that is, the POI data of the bound POIs of the bus station A, based on the topological relationship between the roads and the POIs. When the association relationship between the roads and the POIs includes the binding relationship and the topological relationship, the content information of the bound POIs of the road to be marked may be determined based on the binding relationship between the roads and the POIs, and the orientation information of the bound POIs of the road to be marked may be determined based on the topological relationship between the roads and the POIs. Then both of the content information and the orientation information of the bound POIs are taken as the POI data of the road to be marked. The association relationship between the roads and the POIs in embodiments of the disclosure includes the binding relationship and/or the topological relationship. Not only the content information of the bound POIs may be obtained, but also the orientation information of the bound POIs may be obtained, which may be selected based on an actual requirement, thereby improving the accuracy of the POI data of the bound POIs.

At block S203, target POI data is selected from the POI data of the bound POIs based on a scene where a user is located.

At block S204, a map interface is rendered based on road information of the road to be marked and the target POI data, and the rendered map interface is displayed.

With the technical solution of embodiments of the disclosure, the road to be marked is determined by responding to obtaining the road marking instruction, and the POI data of the bound POIs of the road to be marked is directly obtained based on the association relationship between the roads and the POIs, which greatly improves the efficiency and accuracy of determining the POI data of the bound POIs. In addition, in embodiments of the disclosure, the target POI data is selected from the POI data of the bound POIs based on the current scene where the user is located, and the rendered map interface is displayed to the user after the map interface is rendered based on the road information and the target POI data of the road to be marked. The POI data that meets the requirement of the user is marked for the user based on the scene where the user is located, rather than fixed POI data is statically marked for the road. A personalized requirement of the user for viewing the map data in different scenes may be met, such that the process for marking the POI data of the road in the map is more intelligent.

Figure 3:
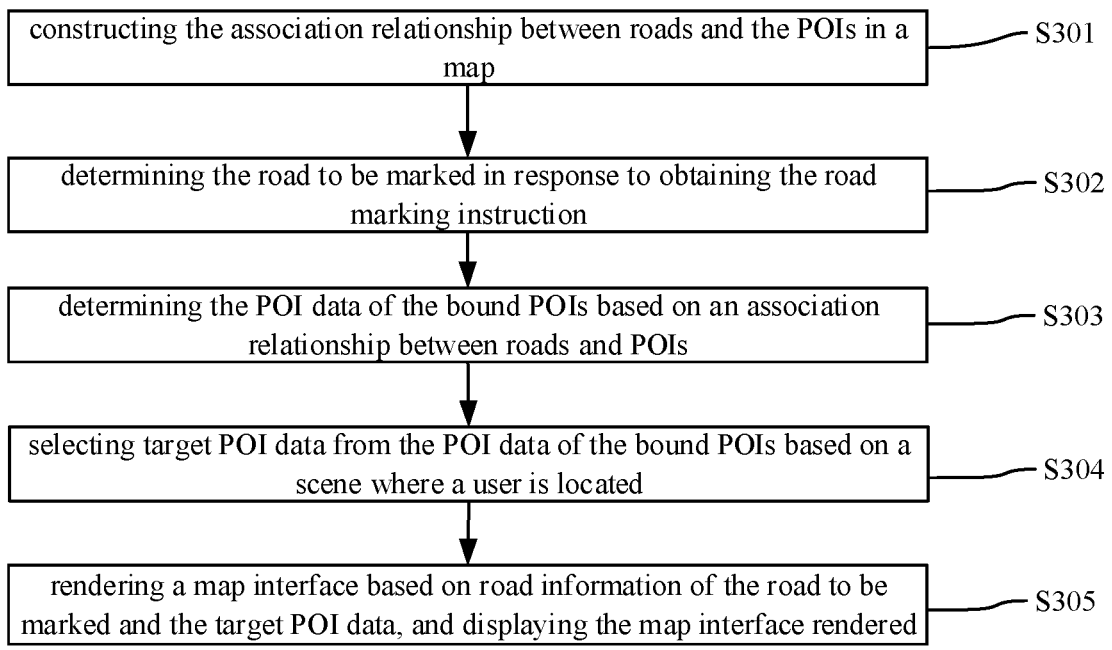
FIG. 3 is a flow chart illustrating a method for processing map data according to another embodiment of the disclosure.

FIG. 3 is a flow chart illustrating a method for processing map data according to another embodiment of the disclosure. This embodiment is further improved on the basis of the above embodiment. Description is made in detail to constructing the association relationship between the roads and the POIs in the map. As illustrated in FIG. 3, the method includes the following.

At block S301, the association relationship between the roads and the POIs in a map is constructed.

In some embodiments, there are multiple ways for constructing the association relationship between the roads and the POIs in the map, which are not limited. For example, in a first implementation, for each road in the map, relevant data of POIs located within a preset range near the road may be queried in a POI database as the POI data of the bound POIs of the road, and the association relationship between the road and the POI data of the bound POIs of the road may be established. In some embodiments, since the user is located in a special scene (such as the scenic spot scene, the business region scene, the traffic region scene or the driving travel scene), there is a high requirement for the road marking. In a second implementation of embodiments of the disclosure, for the special scene, the association relationship between the roads and the POIs may be constructed based on a large amount of historical operation data generated by the user using the map application in combination with the actual requirement of the user. The detailed implementation will be described in detail in following embodiments.

At block S302, the road to be marked is determined in response to obtaining the road marking instruction At block S303, the POI data of the bound POIs is determined based on an association relationship between roads and POIs.

At block S304, target POI data is selected from the POI data of the bound POIs based on a scene where a user is located.

At block S305, a map interface is rendered based on road information of the road to be marked and the target POI data, and the rendered map interface is displayed.

With embodiments of the disclosure, the way for constructing the association relationship between the roads and the POIs in the map is illustrated before the action at the above embodiments is performed, and then the POI data of the bound POIs of the road to be marked may be determined quickly and accurately in response to obtaining the road marking instruction based on the constructed association relationship between the roads and the POIs, thereby providing a guarantee for marking the POIs around the road in the map which meets the current requirement of the user based on the scene where the user is located.

Figure 4:
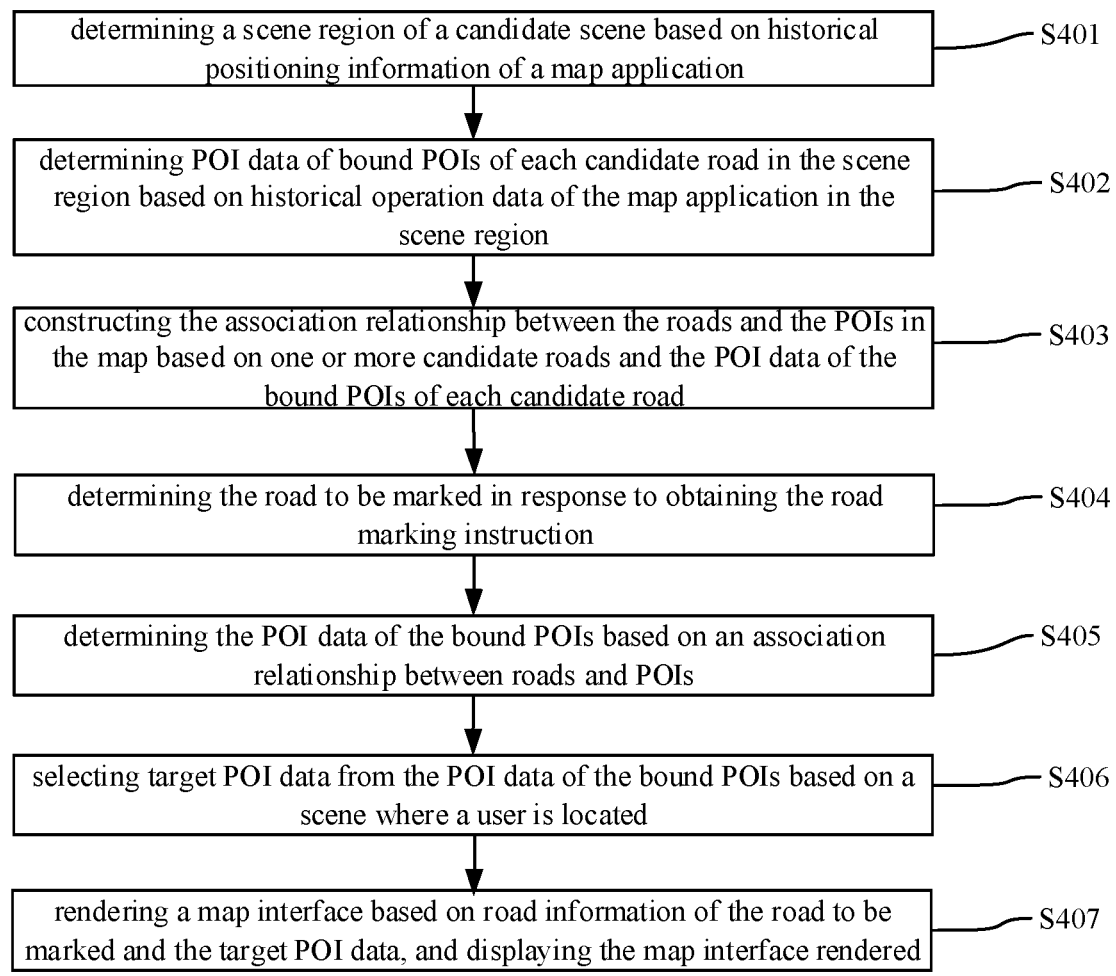
FIG. 4 is a flow chart illustrating a method for processing map data according to another embodiment of the disclosure.

FIG. 4 is a flow chart illustrating a method for processing map data according to another embodiment of the disclosure. This embodiment is further improved on the basis of the above embodiments. Description is made in detail to the second implementation for constructing the association relationship between the roads and the POIs in the above embodiment. As illustrated in FIG. 4, the method includes the following.

At block S401, a scene region of a candidate scene is determined based on historical positioning information of a map application.

In some embodiments, the historical positioning information of the map application may be positioning information obtained every time the map application is started.

In detail, in this embodiment, a way for determining the scene region of the candidate scene based on the historical positioning information of the map application may be: performing big data mining based on a large amount of historical positioning information of the map application, and determining one or more regions with a relatively high occurrence frequency of positioning information as the scene region of the candidate scene. For example, clustering processing may be performed on the large amount of historical positioning information of the map application, and a region surrounded by positioning information clustered in one type may be taken as the scene region of the candidate scene. The large amount of historical positioning information of the map application may also be projected, and a region with dense projection points may be taken as the scene region of the candidate scene. In some embodiments, the scene region of the candidate scene may be further determined based on a top POI in the region and one or more roads around the top POI after the region with the relatively high occurrence frequency of the positioning information is determined. The ways for determining the scene region of the candidate scene are not limited in embodiments of the disclosure.

At block S402, POI data of the bound POIs of each candidate road in the scene region is determined based on historical operation data of the map application in the scene region.

In embodiments of the disclosure, the historical operation data of the map application in the scene region may be operation data generated by the user searching, clicking and viewing the POI in the scene region determined at block S401 through the map application. The candidate road in the scene region may be roads included in the scene region determined at block S401.

In some embodiments, in a first implementation, POIs (i.e., search POIs) that the user historically searches, clicks or views in the scene region are determined based on the historical operation data of the map application in the scene region, and relevant data of the search POIs is taken as the POI data of the bound POIs of each candidate road in the scene region. In a second implementation, one or more search POIs of the scene region are determined based on the historical operation data of the map application in the scene region, and data of each search POI with a distance to the candidate road in the scene region less than a distance threshold in the one or more search POIs is determined, to obtain the POI data of the bound POIs of the candidate road. In detail, the one or more search POIs in the scene region is determined based on a method similar to the first implementation, and then the distance between each search POI and each candidate road in the scene region is analyzed, and the relevant data of each search POI of which a distance to the candidate road is less than the preset distance (such as, 500 m) is taken as the POI data of the bound POI of the candidate road. In this way, the POI data of the bound POIs of each candidate road in the scene region may be distinguished more accurately.

In some embodiments, after determining the POI data of the bound POIs of each candidate road based on the above two implementations, the method may also include: screening the POI data of the bound POIs of each candidate road based on the candidate scene corresponding to the scene region. In detail, the POI data of the bound POIs may be further screened by utilizing a screening rule such as data iteration and evaluation, based on different requirements of the user in different candidate scenes, and unreasonable data may be eliminated to obtain final POI data of the bound POIs of each candidate road. For example, when the candidate scene is the scenic spot scene, and the user has a requirement of knowing about a characteristic POI in the scenic spot, a screening rule corresponding to the scenic spot scene may be eliminating unimportant POI data in the current scene, such as the traffic light, the camera and the speed limit sign. In embodiments of the disclosure, the above setting may have following advantages. The POI data of the bound POIs of the candidate roads in different scenes is screened based on the actual requirement of the user in different scenes, such that the POI data of the bound POIs of each road is more accurate and more in line with the requirement of the user.

At block S403, the association relationship between the roads and the POIs in the map is constructed based on one or more candidate roads and the POI data of the bound POIs of each candidate road.

In some embodiments, the association relationship (such as a mapping relationship) may be established for each candidate road and the POI data of the bound POIs of the candidate roads after the candidate roads in each scene region and the POI data of the bound POIs of the candidate roads are obtained, thereby completing constructing the association relationship between the roads and the POIs.

In some embodiments, a binding relationship and/or a topological relationship between the roads and the POIs in the map is constructed based on the one or more candidate roads and the POI data of the bound POIs of each candidate road. In detail, the binding relationship between the roads and the POIs may be constructed based on the one or more candidate roads and content information of the bound POIs of each candidate road. Exemplarily, as illustrated in FIG. 2B, the binding relationship between the road A and the POI data of the bound POIs of the road A may be: the road A→(a bus stop A: content information; a hotel A: content information; and a subway entrance A: content information). The topological relationship may be constructed based on the one or more candidate roads and orientation information of the bound POIs of each candidate road. Exemplarily, as illustrated in FIG. 2B, the topological relationship between the road A and the POI data of the bound POIs of the road A may be: road A→(a bus station A: north, less than 500 m; a hotel A: south, less than 500 m; and a subway entrance A: northeast, 1.2 km). The association relationship between the roads and the POIs constructed in embodiments of the disclosure includes the binding relationship and/or the topological relationship. Not only the content information but also the orientation information of the POI data of the bound POIs may be obtained based on the association relationship, which may provide multi-dimensional accurate data for determining the POI data of the bound POIs.

At block S404, the road to be marked is determined in response to obtaining the road marking instruction.

At block S405, the POI data of the bound POIs is determined based on an association relationship between roads and POIs.

At block S406, target POI data is selected from the POI data of the bound POIs based on a scene where a user is located.

At block S407, a map interface is rendered based on road information of the road to be marked and the target POI data, and the rendered map interface is displayed.

With the technical solution of embodiments of the disclosure, the scene region of the candidate scene is determined based on the historical positioning information of the map application, and the POI data of the bound POIs of each candidate road in each scene region is determined based on the historical operation data generated by the user using the map application in the scene region, and then the association relationship between on the one or more candidate roads and the POI data of the bound POIs of each candidate road is constructed. In embodiments of the disclosure, the association relationship between the roads and the POI data is constructed based on the large amount of historical usage data generated by users accessing the map application in combination with the actual search requirement of the user in a special candidate scene, thereby improving the accuracy of the association relationship between the roads and the POIs. Based on the association relationship between the roads and the POIs constructed in this embodiment, the determined POI data of the bound POIs of the road to be marked is more in line with the actual search requirement of the user, which provides a guarantee for marking the POIs around the road that meets a current requirement of the user in the map based on the scene where the user is located.

In some embodiments, when the road to be marked belongs to the road in the scene region of the candidate scene determined at block S401, the association relationship currently employed between the roads and the POIs may be constructed based on the second implementation described at blocks S401-S403 in the above embodiment. When the road to be marked does not belong to the road in the scene region of the candidate scene determined at block S401, the association relationship currently employed between the roads and the POIs may be constructed by the first implementation described at block S301 in the above embodiment.

Figure 5A:
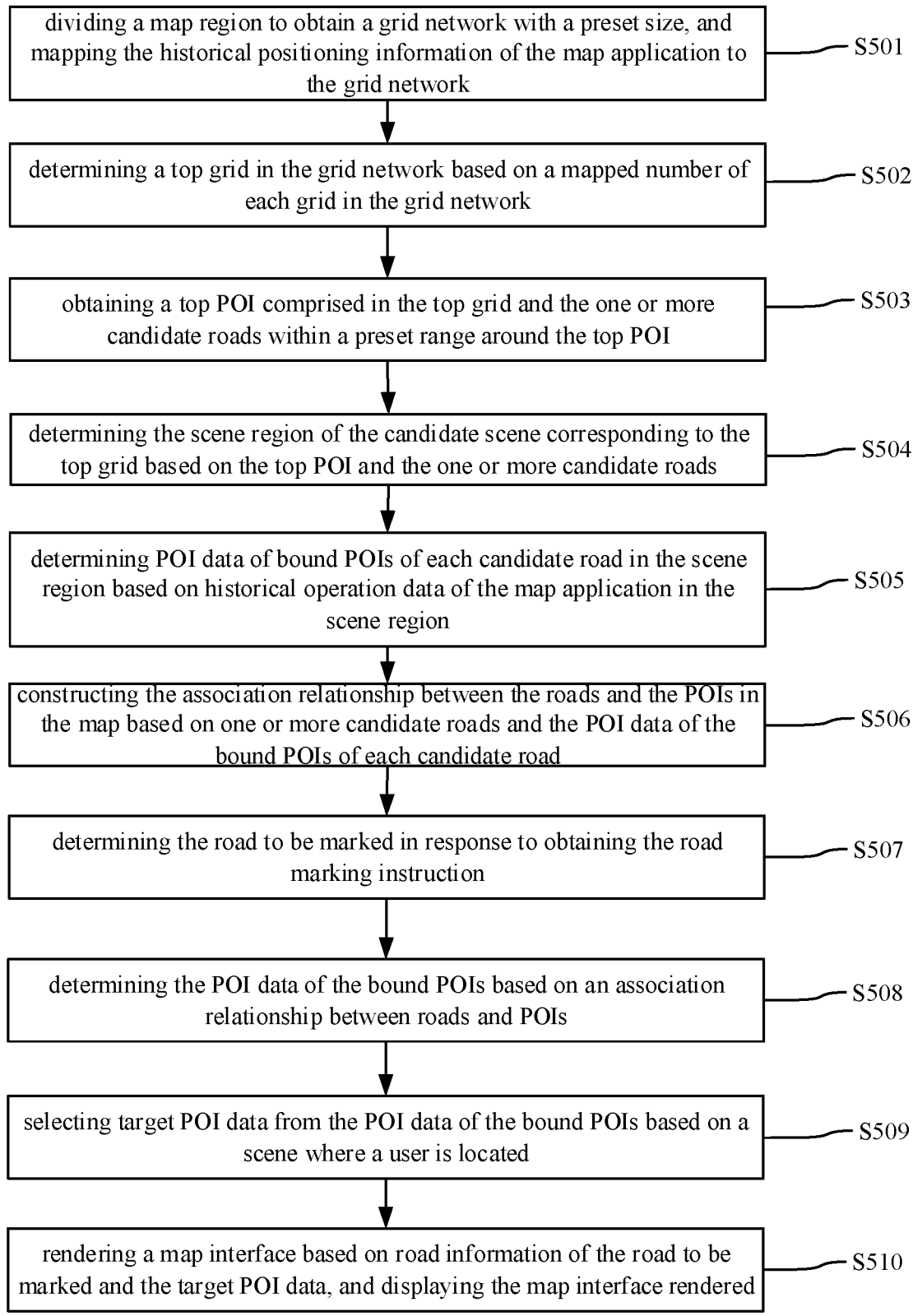
FIG. 5A is a flow chart illustrating a method for processing map data according to another embodiment of the disclosure.
Figure 5B:
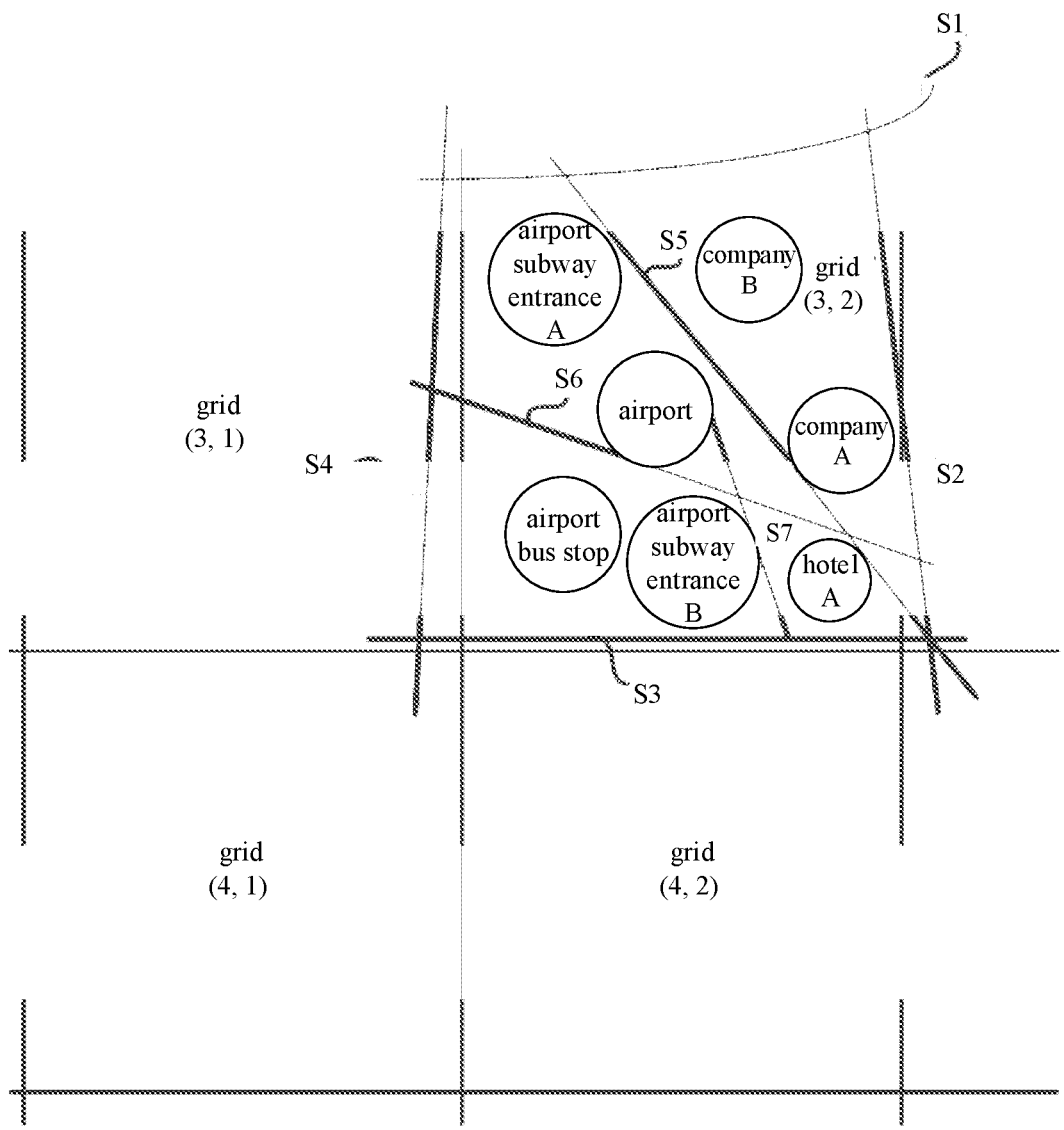
FIG. 5B is a schematic diagram illustrating partial grids of a grid network according to an embodiment of the disclosure.

FIG. 5A is a flow chart illustrating a method for processing map data according to another embodiment of the disclosure. FIG. 5B is a schematic diagram illustrating partial grids of a grid network according to an embodiment of the disclosure. This embodiment is further improved on the basis of the above embodiments. Description will be made in detail below to determining the scene region of the candidate scene based on the historical positioning information of the map application. As illustrated in FIGS. 5A-5B, the method includes the following.

At block S501, a map region is divided to obtain a grid network with a preset size, and the historical positioning information of the map application is mapped to the grid network.

In some embodiments, map data may be divided into multiple grids with a preset size (such as 1 km*1 km) to defined the grid network based on a preset standard (such as a 1 km*1 km standard). Exemplarily, FIG. 5B is a schematic diagram illustrating the partial grids of the grid network. A large amount of the positioning information of is obtained when the map application is started by users. For example, the large amount of the positioning information is obtained when the map application is started every time by users within a preset time period (such as 100 days). The large amount of obtained positioning information is mapped to grids corresponding to the grid network. In detail, for each piece of positioning information, an X coordinate value and a Y coordinate value of the positioning information are measured based on a size of each grid in the grid network, the grid corresponding to the positioning information is determined, and the positioning information is mapped to the corresponding grid. For example, it is assumed that each grid size is 1 km*1 km, and a certain piece of positioning information is (3020, 2015). In this case, the X coordinate value 3020 and the Y coordinate value 2015 in the positioning information may be divided by 1000 and rounded down to obtain (3, 2), and then the positioning information (3020, 2015) is mapped into a second grid in a third row in the grid network.

At block S502, a top grid in the grid network is determined based on a mapped number of each grid in the grid network.

In some embodiments, after all the pieces of positioning information are mapped into the grid network, the mapped number of each grid in the grid network is counted, that is, the number of pieces of positioning information mapped in each grid is counted. For each grid, the more the mapped number of the grid, the more frequently the user is in the region where the grid is located when starting the map application, that is, the higher a popularity of the grid. A preset number of grids with the higher mapped number are selected as the top grids based on the mapped number. A mapping number threshold may also be preset, and grids with the mapped number greater than the mapping number threshold are taken as the top grids.

At block S503, a top POI included in the top grid and the one or more candidate roads within a preset range around the top POI are obtained.

In some embodiments, after the top grid is determined, each POI included in each top grid may be obtained as the top POI of the grid, and then the roads within the preset range (such as 2 km) around the top POI may be extracted as the candidate road in the top grid. Exemplarily, as illustrated in FIG. 5B, it is assumed that a grid (3, 2) is the top grid. An airport subway entrance A, an airport, an airport bus stop, an airport subway entrance B, a hotel A, a company A and a company B in the grid are obtained as the top POIs of the grid (3,2). Roads S1-S7 within 2 km around each top POI are extracted as the candidate roads in the grid (3, 2).

At block S504, the scene region of the candidate scene corresponding to the top grid is determined based on the top POI and the one or more candidate roads.

In some embodiments, the top POI may be analyzed, and the candidate scene corresponding to the top grid is determined. In detail, the top POI may be analyzed to determine whether the top grid belongs to a preset candidate scene. Exemplarily, most of the top POIs in the grid (3, 2) in FIG. 5B are related to the airport, so the top grid corresponds to an airport regional scene. The candidate road in the top grid is analyzed, and the scene region of the candidate scene is determined. In detail, a maximum region enclosed by each candidate road may be taken as the scene region of the candidate scene. Exemplarily, in FIG. 5B, the maximum region enclosed by the candidate roads S1-S7 of the grid (3, 2) (that is, a region enclosed by candidate roads S1-S4) is taken as the scene region of the airport regional scene.

At block S505, POI data of a bound POIs of each candidate road in the scene region is determined based on the historical operation data of the map application in the scene region.

At block S506, the association relationship between the roads and the POIs in the map is constructed based on one or more candidate roads and the POI data of the bound POIs of each candidate road.

At block S507, the road to be marked is determined in response to obtaining the road marking instruction.

At block S508, the POI data of the bound POIs is determined based on an association relationship between roads and POIs.

At block S509, target POI data is selected from the POI data of the bound POIs based on a scene where a user is located.

At block S510, a map interface is rendered based on road information of the road to be marked and the target POI data, and the rendered map interface is displayed.

With the technical solution of embodiments of the disclosure, the map region is divided to obtain the grid network with the preset size when the scene region of the candidate scene is determined. The historical positioning information of the map application is mapped to the grid network. The top grid in the grid network is determined based on the mapped number of each grid. The scene region of the candidate scene corresponding to the top grid is determined based on the top POI included in the top grid and the one or more candidate roads within the preset range around the top POI. The technical solution does not simply take a top network as the scene region of the candidate scene. The determined scenario region of the candidate scene determined in embodiments of the disclosure is more accurately, thereby providing a guarantee for constructing the association relationship between the candidate roads and the POIs of each candidate road, and marking the POIs around each road that meet the current requirement of the user in the map based on the scene where the user is located.

Figure 6:
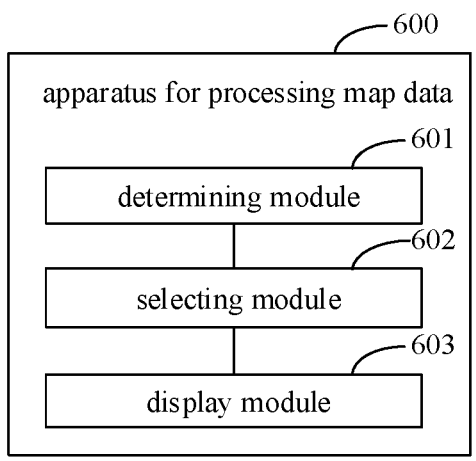
FIG. 6 is a block diagram illustrating an apparatus for processing map data according to an embodiment of the disclosure.

FIG. 6 is a block diagram illustrating an apparatus for processing map data according to an embodiment of the disclosure. Embodiments of the disclosure are applicable to a condition for processing map data based on a road marking instruction triggered by a user. The apparatus may implement the method for processing the map data according to any of embodiments of the disclosure. The apparatus may be configured in an electronic device. The electronic device may be a client device of a map application, or a server of the map application. The apparatus 600 includes a determining module 601, a selecting module 602, and a display module 603. The determining module 601 is configured to determine POI data of bound POIs of a road to be marked in response to obtaining a road marking instruction. The selecting module 602 is configured to select target POI data of the bound POIs from the POI data based on a scene where a user is located. The display module 603 is configured to render a map interface based on road information of the road to be marked and the target POI data, and to display the map interface rendered.

With the technical solution according to embodiments of the disclosure, the POI data of the bound POIs of the road to be marked is determined by responding to the road marking instruction. The target POI data needing to be marked currently is further selected from the POI data of the bound POIs based on the current scene where the user is located. Then the map interface is rendered and displayed to the user based on the road information of the road to be marked and the target POI data. With the technical solution according to embodiments of the disclosure, not fixed POI data of the bound POIs is statically marked for the road, but the road is marked with the POI data corresponding to the scene where the user is located, which may mark the POI data that meets the requirement of the user in combination with the requirements of the user in different scenes. A problem that an intelligent search service of an existing electronic map may not meet the personalized requirement of the user for viewing map data in different scenes is solved. The flexibility and intelligence of marking the POI data for the road in the map are improved. A data display scheme of the electronic map is optimized.

Further, the determining module 610 includes: a first determining unit and a second determining unit. The first determining unit is configured to determine the road to be marked in response to obtaining the road marking instruction. The second determining unit is configured to determine the POI data of the bound POIs based on an association relationship between roads and POIs.

Further, the second determining unit is configured to: determine content information of the bound POIs of based on a binding relationship between the roads and the POIs; and/or determine orientation information of the bound POIs based on a topological relationship between the roads and the POIs.

Further, the selecting module 602 is configured to: determine a data type to be displayed in the scene based on the scene where the user is located; and screen the POI data of the bound POIs based on the data type to determine the target POI data.

Further, the apparatus also includes a relationship constructing module. The relationship constructing module is configured to construct the association relationship between the roads and the POIs in a map.

Further, the relationship constructing module includes: a third determining module, a fourth determining module, and a relationship constructing unit. The third determining module is configured to determine a scene region of a candidate scene based on historical positioning information of a map application. The fourth determining module is configured to determine POI data of bound POIs of each candidate road in the scene region based on historical operation data of the map application in the scene region. The relationship constructing unit is configured to construct the association relationship between the roads and the POIs in the map based on one or more candidate roads and the POI data of each candidate road.

Further, the third determining module is configured to: divide a map region to obtain a grid network with a preset size, and map the historical positioning information of the map application to the grid network; determine a top grid in the grid network based on a mapped number of each grid in the grid network; obtain a top POI comprised in the top grid and the one or more candidate roads within a preset range around the top POI; and determine the scene region of the candidate scene corresponding to the top grid based on the top POI and the one or more candidate roads.

Further, the fourth determining module is configured to: determine one or more search POIs of the scene region based on the historical operation data of the map application in the scene region; and determine data of a search POI with a distance to the candidate road in the scene region less than a distance threshold in the one or more search POIs, to obtain the POI data of the bound POIs of the candidate road.

Further, the relationship constructing module further includes: a data screening unit. The data screening unit is configured to screen the POI data of the bound POIs of each candidate road based on the candidate scene corresponding to the scene region.

Further, the relationship constructing unit is configured to: construct a binding relationship and/or a topological relationship between the roads and the POIs in the map based on the one or more candidate roads and the POI data of the bound POIs of each candidate road.

According to embodiments of the disclosure, the disclosure also provides an electronic device and a readable storage medium.

Figure 7:
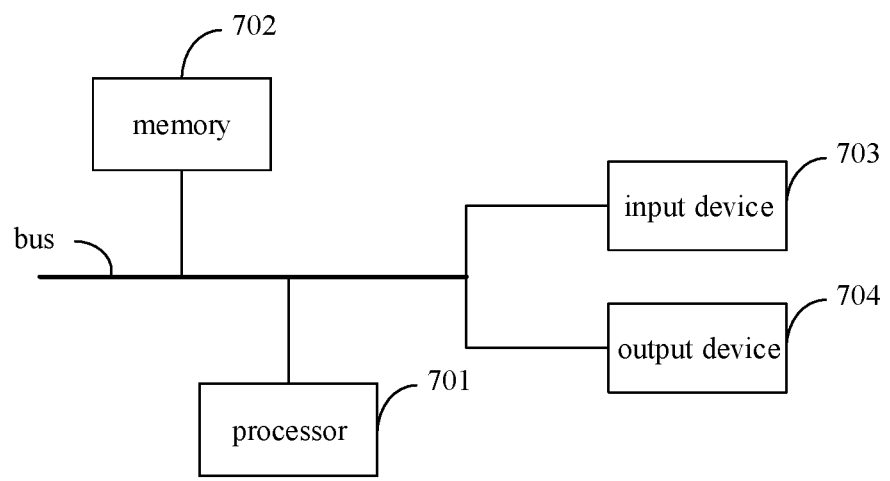
FIG. 7 is a block diagram illustrating an electronic device capable of implementing a method for processing map data according to embodiments of the disclosure.

As illustrated in FIG. 7, FIG. 7 is a block diagram illustrating an electronic device capable of implementing a method for processing map data according to embodiments of the disclosure. The electronic device aims to represent various forms of digital computers, such as a laptop computer, a desktop computer, a workstation, a personal digital assistant, a server, a blade server, a mainframe computer and other suitable computer. The electronic device may also represent various forms of mobile devices, such as personal digital processing, a cellular phone, a smart phone, a wearable device and other similar computing device. The components, connections and relationships of the components, and functions of the components illustrated herein are merely examples, and are not intended to limit the implementation of the disclosure described and/or claimed herein.

As illustrated in FIG. 7, the electronic device includes: one or more processors 701, a memory 702, and interfaces for connecting various components, including a high-speed interface and a low-speed interface. Various components are connected to each other via different buses, and may be mounted on a common main board or in other ways as required. The processor may process instructions executed within the electronic device, including instructions stored in or on the memory to display graphical information of the GUI (graphical user interface) on an external input/output device (such as a display device coupled to an interface). In other implementations, multiple processors and/or multiple buses may be used together with multiple memories if desired. Similarly, multiple electronic devices may be connected, and each device provides some necessary operations (for example, as a server array, a group of blade servers, or a multiprocessor system). In FIG. 7, a processor 701 is taken as an example.

The memory 702 is a non-transitory computer readable storage medium provided by the disclosure. The memory is configured to store instructions executable by at least one processor, to enable the at least one processor to execute the method for processing the map data provided by the disclosure. The non-transitory computer readable storage medium provided by the disclosure is configured to store computer instructions. The computer instructions are configured to enable a computer to execute the method for processing the map data provided by the disclosure.

As the non-transitory computer readable storage medium, the memory 702 may be configured to store non-transitory software programs, non-transitory computer executable programs and modules, such as program instructions/module (such as the determining module 601, the selecting module 602, and the display module 603 illustrated in FIG. 6) corresponding to the method for processing the map data according to embodiments of the disclosure. The processor 701 is configured to execute various functional applications and data processing of the server by operating non-transitory software programs, instructions and modules stored in the memory 702, that is, implements the method for processing the map data according to the above method embodiments.

The memory 702 may include a storage program region and a storage data region. The storage program region may store an application required by an operating system and at least one function. The storage data region may store data created according to predicted usage of the electronic device based on the semantic representation. In addition, the memory 702 may include a high-speed random access memory, and may also include a non-transitory memory, such as at least one disk memory device, a flash memory device, or other non-transitory solid-state memory device. In some embodiments, the memory 702 may optionally include memories remotely located to the processor 701, and these remote memories may be connected to the electronic device via a network. Examples of the above network include, but are not limited to, an Internet, an intranet, a local area network, a mobile communication network and combinations thereof.

The electronic device capable of implementing the method for processing the map data may also include: an input device 703 and an output device 704. The processor 701, the memory 702, the input device 703, and the output device 704 may be connected via a bus or in other means. In FIG. 7, the bus is taken as an example.

The input device 703 may receive inputted digital or character information, and generate key signal input related to user setting and function control of the electronic device capable of implementing the method for processing the map data, such as a touch screen, a keypad, a mouse, a track pad, a touch pad, an indicator stick, one or more mouse buttons, a trackball, a joystick and other input device. The output device 704 may include a display device, an auxiliary lighting device (e.g., LED), a haptic feedback device (e.g., a vibration motor), and the like. The display device may include, but be not limited to, a liquid crystal display (LCD), a light emitting diode (LED) display, and a plasma display. In some embodiments, the display device may be the touch screen.

The various implementations of the system and technologies described herein may be implemented in a digital electronic circuit system, an integrated circuit system, an application specific ASIC (application specific integrated circuit), a computer hardware, a firmware, a software, and/or combinations thereof. These various implementations may include: being implemented in one or more computer programs. The one or more computer programs may be executed and/or interpreted on a programmable system including at least one programmable processor. The programmable processor may be a special purpose or general purpose programmable processor, may receive data and instructions from a storage system, at least one input device, and at least one output device, and may transmit data and the instructions to the storage system, the at least one input device, and the at least one output device.

These computing programs (also called programs, software, software applications, or codes) include machine instructions of programmable processors, and may be implemented by utilizing high-level procedures and/or object-oriented programming languages, and/or assembly/machine languages. As used herein, the terms "machine readable medium" and "computer readable medium" refer to any computer program product, device, and/or apparatus (such as, a magnetic disk, an optical disk, a memory, a programmable logic device (PLD)) for providing machine instructions and/or data to a programmable processor, including a machine readable medium that receives machine instructions as a machine readable signal. The term "machine readable signal" refers to any signal for providing the machine instructions and/or data to the programmable processor.

To provide interaction with a user, the system and technologies described herein may be implemented on a computer. The computer has a display device (such as, a CRT (cathode ray tube) or an LCD (liquid crystal display) monitor) for displaying information to the user, a keyboard and a pointing device (such as, a mouse or a trackball), through which the user may provide the input to the computer. Other types of devices may also be configured to provide interaction with the user. For example, the feedback provided to the user may be any form of sensory feedback (such as, visual feedback, auditory feedback, or tactile feedback), and the input from the user may be received in any form (including acoustic input, voice input or tactile input).

The system and technologies described herein may be implemented in a computing system including a background component (such as, a data server), a computing system including a middleware component (such as, an application server), or a computing system including a front-end component (such as, a user computer having a graphical user interface or a web browser through which the user may interact with embodiments of the system and technologies described herein), or a computing system including any combination of such background component, the middleware components and the front-end component. Components of the system may be connected to each other via digital data communication in any form or medium (such as, a communication network). Examples of the communication network include a local area network (LAN), a wide area networks (WAN), and the Internet.

The computer system may include a client and a server. The client and the server are generally remote from each other and generally interact via the communication network. A relationship between the client and the server is generated by computer programs operated on a corresponding computer and having a client-server relationship with each other.

With the technical solution according to embodiments of the disclosure, the POI data of the bound POIs of the road to be marked is determined by responding to the road marking instruction. The target POI data needing to be marked currently is further selected from the POI data of the bound POIs based on the current scene where the user is located. Then the map interface is rendered and displayed to the user based on the road information of the road to be marked and the target POI data. With the technical solution according to embodiments of the disclosure, not fixed POI data of the bound POIs is statically marked for the road, but the road is marked with the POI data corresponding to the scene where the user is located, which may mark the POI data that meets the requirement of the user in combination with the requirements of the user in different scenes. A problem that an intelligent search service of an existing electronic map may not meet the personalized requirement of the user for viewing map data in different scenes is solved. The flexibility and intelligence of marking the POI data for the road in the map are improved. A data display scheme of the electronic map is optimized.

It should be understood that, steps may be reordered, added or deleted by utilizing flows in the various forms illustrated above. For example, the steps described in the disclosure may be executed in parallel, sequentially or in different orders, so long as desired results of the technical solution disclosed in the disclosure may be achieved, there is no limitation here.

The above detailed implementations do not limit the protection scope of the disclosure. It should be understood by the skilled in the art that various modifications, combinations, sub-combinations and substitutions may be made based on design requirements and other factors. Any modification, equivalent substitution and improvement made within the spirit and the principle of the disclosure shall be included in the protection scope of disclosure.

What is claimed is:

1. A method for processing map data, comprising:
   determining POI data of bound points of interest (POI) of a road to be marked in response to obtaining a road marking instruction;
   selecting target POI data from the POI data of the bound POIs based on a scene where a user is located; and
   rendering a map interface based on road information of the road to be marked and the target POI data, and displaying the map interface rendered;
   wherein determining the POI data of the bound POIs of the road to be marked in response to obtaining the road marking instruction comprises:
   determining the road to be marked in response to obtaining the road marking instruction; and
   determining the POI data of the bound POIs based on an association relationship between roads and POIs;
   wherein, the method further comprises:
   constructing the association relationship between roads and the POIs in a map;
   wherein constructing the association relationship between the roads and the POIs in the map comprises:
   determining a scene region of a candidate scene based on historical positioning information of a map application;
   determining POI data of bound POIs of each candidate road in the scene region based on historical operation data of the map application in the scene region; and
   constructing the association relationship between the roads and the POIs in the map based on one or more candidate roads and the POI data of the bound POIs of each candidate road.

2. The method of claim 1, wherein determining the POI data of the bound POIs based on the association relationship between the roads and the POIs comprises:

determining content information of the bound POIs based on a binding relationship between the roads and the POIs; and/or determining orientation information of the bound POIs based on a topological relationship between the roads and the POIs.

3. The method of claim 1, wherein selecting the target POI data from the POI data of the bound POIs based on the scene where the user is located comprises:

determining a data type to be displayed in the scene based on the scene where the user is located; and screening the POI data of the bound POIs based on the data type to determine the target POI data.

4. The method of claim 1, wherein determining the scene region of the candidate scene based on the historical positioning information of the map application comprises:

dividing a map region to obtain a grid network with a preset size, and mapping the historical positioning information of the map application to the grid network;

determining a top grid in the grid network based on a mapped number of each grid in the grid network;

obtaining a top POI comprised in the top grid and the one or more candidate roads within a preset range around the top POI; and determining the scene region of the candidate scene corresponding to the top grid based on the top POI and the one or more candidate roads.

5. The method of claim 1, wherein determining the POI data of the bound POIs of each candidate road in the scene region based on the historical operation data of the map application in the scene region comprises:

determining one or more search POIs of the scene region based on the historical operation data of the map application in the scene region; and determining data of each search POI with a distance to the candidate road in the scene region less than a distance threshold in the one or more search POIs, to obtain the POI data of the bound POI of the candidate road.

6. The method of claim 5, after determining the data of the search POI with the distance to the candidate road in the scene region less than the distance threshold in the one or more search POIs, to obtain the POI data of the bound POIs of the candidate road, further comprising:

screening the POI data of the bound POIs of each candidate road based on the candidate scene corresponding to the scene region.

7. The method of claim 1, wherein constructing the association relationship between the roads and the POIs in the map based on the one or more candidate roads and the POI data of the bound POIs of each candidate road comprises:

constructing a binding relationship and/or a topological relationship between the roads and the POIs in the map based on the one or more candidate roads and the POI data of the bound POI of each candidate road.

8. An electronic device, comprising:

at least one processor; and a memory, communicatively coupled to the at least one processor, wherein the memory is configured to store instructions executable by the at least one processor, and when the instructions are executed by the at least one processor, the at least one processor is configured to:

determine POI data of bound POIs of a road to be marked in response to obtaining a road marking instruction;

select target POI data from the POI data of the bound POIs based on a scene where a user is located; and render a map interface based on road information of the road to be marked and the target POI data, and to display the map interface rendered;

wherein the at least one processor is configured to:

determine the road to be marked in response to obtaining the road marking instruction; and determine the POI data of the bound POIs based on an association relationship between roads and POI;

wherein the at least one processor is configured to, construct the association relationship between the roads and the POIs in a map, and the at least one processor is further configured to:

determine a scene region of a candidate scene based on historical positioning information of a map application;

determine POI data of bound POIs of each candidate road in the scene region based on historical operation data of the map application in the scene region; and construct the association relationship between the roads and the POIs in the map based on one or more candidate roads and the POI data of each candidate road.

9. The device of claim 8, wherein the at least one processor is configured to:

determine content information of the bound POIs of based on a binding relationship between the roads and the POIs; and/or determine orientation information of the bound POIs based on a topological relationship between the roads and the POIs.

10. The device of claim 8, wherein the at least one processor is configured to:

determine a data type to be displayed in the scene based on the scene where the user is located; and screen the POI data of the bound POIs based on the data type to determine the target POI data.

11. The device of claim 8, wherein the at least one processor is configured to:

divide a map region to obtain a grid network with a preset size, and map the historical positioning information of the map application to the grid network;

determine a top grid in the grid network based on a mapped number of each grid in the grid network;

obtain a top POI comprised in the top grid and the one or more candidate roads within a preset range around the top POI; and determine the scene region of the candidate scene corresponding to the top grid based on the top POI and the one or more candidate roads.

12. The device of claim 8, wherein the at least one processor is configured to:

determine one or more search POIs of the scene region based on the historical operation data of the map application in the scene region; and determine data of a search POI with a distance to the candidate road in the scene region less than a distance threshold in the one or more search POIs, to obtain the POI data of the bound POIs of the candidate road.

13. The device of claim 12, wherein the at least one processor is configured to:

a data screening unit, configured to screen the POI data of the bound POIs of each candidate road based on the candidate scene corresponding to the scene region.

14. The device of claim 8, wherein the at least one processor is configured to:

construct a binding relationship and/or a topological relationship between the roads and the POIs in the map based on the one or more candidate roads and the POI data of the bound POIs of each candidate road.

15. A non-transitory computer readable storage medium having computer instructions stored thereon, wherein the computer instructions are configured to cause a computer to execute a method for processing the map data, and the method comprises:
- determining POI data of bound POIs of a road to be marked in response to obtaining a road marking instruction;
- selecting target POI data from the POI data of the bound POIs based on a scene where a user is located; and
- rendering a map interface based on road information of the road to be marked and the target POI data, and displaying the map interface rendered;
- wherein determining the POI data of the bound POIs of the road to be marked in response to obtaining the road marking instruction comprises:
- determining the road to be marked in response to obtaining the road marking instruction; and
- determining the POI data of the bound POIs based on an association relationship between roads and POIs;
- wherein, the method further comprises:
- constructing the association relationship between roads and the POIs in a map;
- wherein constructing the association relationship between the roads and the POIs in the map comprises:
- determining a scene region of a candidate scene based on historical positioning information of a map application;
- determining POI data of bound POIs of each candidate road in the scene region based on historical operation data of the map application in the scene region; and
- constructing the association relationship between the roads and the POIs in the map based on one or more candidate roads and the POI data of the bound POIs of each candidate road.

* * * * *